United States Patent [19]

Foster

[11] Patent Number: 4,679,686

[45] Date of Patent: Jul. 14, 1987

[54] BEARING SYSTEM FOR RECIPROCATING FLOOR CONVEYOR

[76] Inventor: Raymond K. Foster, P.O. Box 1, Madras, Oreg. 97741

[21] Appl. No.: 680,069

[22] Filed: Dec. 10, 1984

Related U.S. Application Data

[63] Continuation-in-part of Ser. No. 346,865, Feb. 8, 1982, Pat. No. 4,492,303.

[51] Int. Cl.⁴ .............................................. B65G 25/00
[52] U.S. Cl. .................................. 198/750; 414/525 B
[58] Field of Search .............. 198/750, 648, 850, 853, 198/775, 851, 803.01; 308/3 A, 3 C, 3 R, 3.6; 414/525 B, 525 R, 509; 403/194, 195

[56] References Cited

U.S. PATENT DOCUMENTS

| | | | |
|---|---|---|---|
| 4,143,760 | 3/1979 | Hallstrom | 198/750 |
| 4,144,963 | 3/1979 | Hallstrom | 198/775 |
| 4,184,587 | 1/1980 | Hallstrom | 198/750 |
| 4,474,285 | 10/1984 | Foster | 198/750 |
| 4,492,303 | 1/1985 | Foster | 414/525 B |
| 4,518,076 | 5/1985 | Feisel et al. | 198/648 |

FOREIGN PATENT DOCUMENTS 2753778  6/1978  Fed. Rep. of Germany ...... 198/851

OTHER PUBLICATIONS

PlateTop Roller Chain with Snap-On Top Plates, Chain Belt Company, Bulletin 57-12, 1959.

Primary Examiner—Robert J. Spar
Assistant Examiner—Jonathan D. Holmes
Attorney, Agent, or Firm—Delbert J. Barnard

[57] ABSTRACT

A floor member (10) of channel form is pushed downwardly to install it onto bearings (16, 90, 144) which have been previously installed onto guide tubes (12, 12', 12") which extend in the same direction as the floor members (10). The bearings (16, 90, 144) have sidewall portions which slope downwardly and outwardly to a lower edge (76, 108, 154, 156). These sidewalls (66, 68, 100, 102, 150, 152) are connected at their upper portions to the bearings (16, 90, 144) in such a way that they will flex inwardly, into spaces provided for them, in response to the downward "snap on" movement of the floor member (10). Brace wings (52, 54, 110, 112, 174, 176) may be provided to function together with the lower edges (76, 108, 154, 156) to hold the floor members (10) onto the bearings (16, 90, 144). Bearings (90, 144) are provided which themselves snap onto the guide beams (12', 12"). These bearings (90, 144) include lock flanges in the form of cantilever springs, resulting in a good tight fit despite size differences which may exist due to low manufacturing tolerances.

7 Claims, 18 Drawing Figures

BEARING SYSTEM FOR RECIPROCATING FLOOR CONVEYOR

RELATED APPLICATION

This application is a continuation-in-part of my prior application Ser. No. 346,865, filed Feb. 8, 1982, now U.S. Pat. No. 4,492,303, and entitled Improved Drive/-Guide System For A Reciprocating Floor Conveyor.

TECHNICAL FIELD

This invention relates to improvements in reciprocating floor conveyors, and in particular to an improvement in the construction of a plastic slide bearing used for supporting the floor members of such conveyors for longitudinal reciprocation. More specifically, the invention relates to a bearing construction which will allow the floor members to be snapped into place from above.

BACKGROUND ART

The present invention improves the type of conveyor disclosed by U.S. Pat. No. 4,143,760, granted Mar. 13, 1979, and U.S. Pat. No. 4,184,587, granted Jan. 22, 1980, both to Olaf A. Hallstrom.

The above-mentioned U.S. Pat. No. 4,184,587 purports to provide a plastic slide bearing construction which will allow the floor members of the conveyor to be snapped into place from above. However, in order for this to be possible, the plastic material used for side portions of the bearing must be capable of being compressed in size. A principal object of the present invention is to provide a manner of constructing the bearing so that the floor members can be easily and quickly snapped into place without it being necessary for any material to actually compress in size.

DISCLOSURE OF THE INVENTION

In accordance with the present invention, plastic slide bearings are provided which are characterized by sidewall portions designed to bend or flex inwardly, into spaces provided for such bending of flexure, so that a giving or compressing of the material need not occur.

In accordance with one embodiment of the invention, sidewalls are provided which are in the nature of downwardly and outwardly extending "flap" walls, connected at their upper portions to the top of bearing.

In accordance with another aspect of the invention, the bearings are provided with wings on each side and slot-like spaces are defined vertically between the upper surfaces of the wings and lower edges of the "flap" walls. The inner edges of lower flange portions of the floor members become engaged within the slots when the floor members are installed on the bearings. The wings project outwardly from the sides of the bearings and contact wings on sidewise adjacent bearings provided for the next floor member over. The contact of the wings of the bearings prevent the bearings from spreading in response to upwardly directed loads on the floor members, and also helps spread any such upwardly directed forces throughout the entire floor system.

According to another aspect of the invention, bearings are provided which are constructed to themselves "snap" onto the guide beams. They include lock flanges at their lower portions which present downwardly flaring cam surfaces which contact the upper corners of the guide beams and function to cam the side parts of the bearings apart in response to a downward force on the bearing as it is being snapped into place on the guide beam.

In accordance with yet another aspect of the invention, lock flanges for the bearings are provided which are in the nature of cantilever springs. A vertical space is provided between upper portions of the lock flanges and the top of the bearing which space is smaller than the height of the guide beam. As a result, it becomes necessary for the lock flanges to spring downwardly in order for the bearing to fit onto the guide beam. This construction provides a tight fit of the bearings onto the guide beams without the necessity of a close tolerance of manufacture. In other words, the spring action of the lock flanges accommodates for differences in sizes making it unnecessary to control these differences by close manufacturing tolerances.

Additional features, advantages and objects of the invention are described in the detailed description of the best mode and preferred embodiments. Such detailed description and the claims which follow are both also parts of the description of the invention.

BRIEF DESCRIPTION OF THE DRAWINGS

In the drawings, like element designations refer to like parts throughout, and.

BEST MODE FOR CARRYING OUT THE INVENTION

Figures 1, 2:
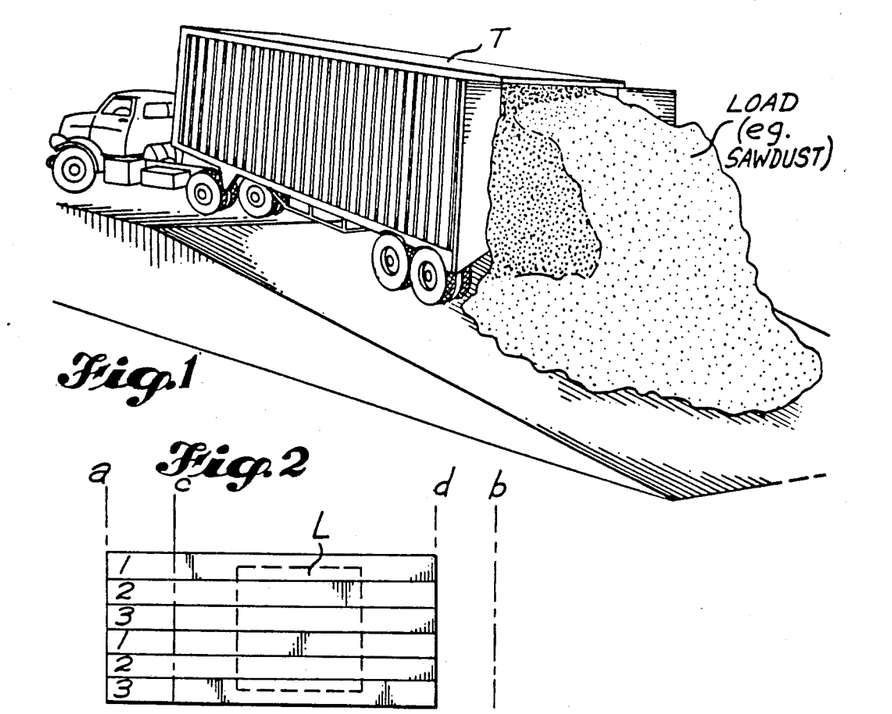
FIG. 1 is a pictorial view of a truck that is equipped with a reciprocating floor conveyor, shown in the process of discharging the load from the truck.
FIG. 2 is a top plan diagram of a conveyor which includes three floor members per group, with each common floor member being identified by common number, such conveyor being shown in a fully retracted position.

FIG. 1 shows a load of sawdust or other bulk material being unloaded from a large truck T by use of a reciprocating floor conveyor within truck T.

FIGS. 1-6 illustrate how the reciprocating floor conveyor works. These figures show two groups of floor members. Each group comprises three independent floor members designated 1, 2 and 3. The members "1" move together. The members "2" move together. And, the members "3" move together.

Figure 3:
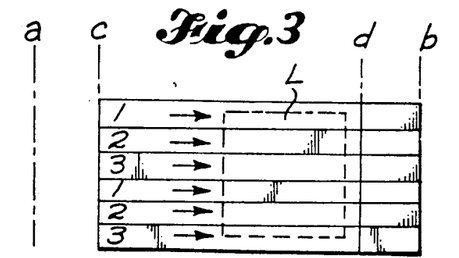
FIG. 3 is a view like FIG. 2, but showing all of the floor members being advanced in unison to convey a load in the direction indicated by arrows.
Figure 4:
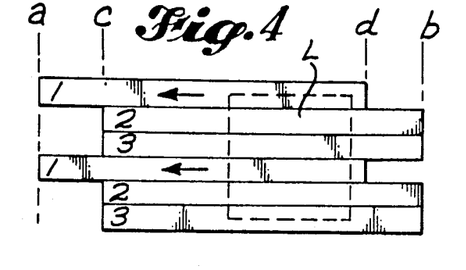
FIG. 4 is a view like FIGS. 2 and 3, showing floor members 2 and 3 stationary while floors members 1 are being retracted.
Figure 5:
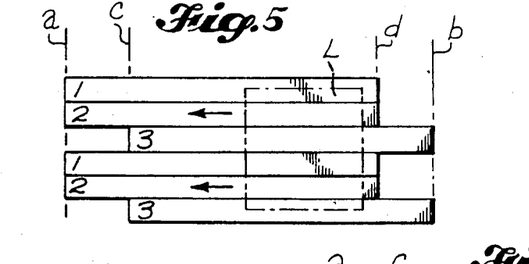
FIG. 5 is a view like FIGS. 2-4, but showing floor members 1 and 3 stationary while floor members 2 are being retracted.
Figure 6:
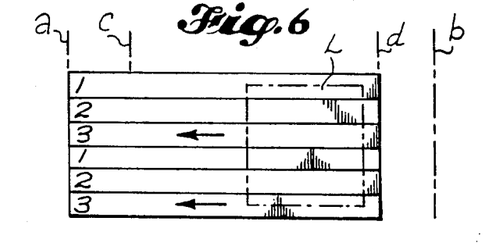
FIG. 6 is a view like FIGS. 2-5, but showing floor members 1 and 2 stationary and floor members 3 being retracted.
Figure 7:
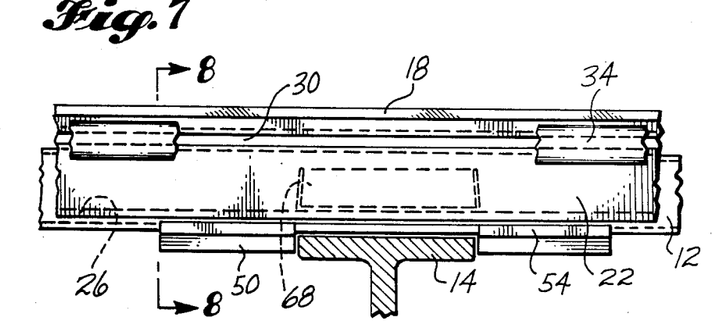
FIG. 7 is an enlarged scale fragmentary view of a region where a floor member guide beam crosses and is attached to a transverse floor support frame member, with a foreground portion of the floor member cut away for the purpose of showing a slide bearing provided at such location in side elevation, and showing a fragmentary portion of the transverse floor support member in section.

FIG. 2 shows all the floor members in a retractive position in which common ends are aligned at a start station 1. The load L is shown centrally positioned on the floor. FIG. 3 shows the floor members after they have all been advanced together, to move the load L forwardly, and show the opposite ends of the floor members aligned at a fully advanced position b. FIG. 4 shows the group "1" floor members being retracted and the groups "2" and "3" floor members held stationary. The Load L does not move because frictional forces exerted on it by the stationary floor members "2" and "3" are larger than the frictional forces exerted on it by the retracting floor members "1". FIG. 5 shows the next step in the sequence. The retracted floor members "1" and the still advanced floor members "3" are held stationary and the floor members "2" are retracted. Again, the Load L does not move. FIG. 6 shows the retracted floor members "1" and "2" stationary and floor members "3" being retracted. Again, the load L does not move. In this example, the load L has moved a distance equal to the endwise movement of the floor, viz. a-c or d-b.

The mechanism for moving the floor members is not a part of the present invention. By way of typical and therefore nonlimited example, such mechanism may be like the mechanism disclosed by aforementioned U.S. Pat. No. 4,143,760, or by my aforementioned copending application Ser. No. 346,865.

FIGS. 7-10 show that the supporting framework for the reciprocating floor members 10 comprises a guide tube 12 for each floor slat member and a plurality of cross frame members 14 to which the guide tubes 12 are welded. My aforementioned copending application Ser. No. 346,865, and U.S. Pat. No. 4,144,963, each discloses the supporting framework in detail.

A principal object of the present invention is to provide plastic slide bearings 16 which can be installed at spaced apart locations on the guide beams 12, and which are constructed to permit the floor members 12 to be easily and quickly snapped into place from above. The aforementioned U.S. Pat. No. 4,184,587 states that the ribs 84 of the bearings disclosed by that patent are resilient and hence this allows the floor members to be installed upon the bearing by pushing downwardly on the floor member to cause the flanges 82 of the floor member to move downwardly past the ribs 84 on the bearings. However, as clearly shown by FIG. 5 of U.S. Pat. No. 4,184,587, this type of action requires deformation of the material used for the ribs 84. In actual practice, it became necessary to install the floor members on the bearings of the type disclosed by U.S. Pat. No. 4,184,587, by sliding the floor members endwise along the guide tube to which the bearings were mounted.

Figure 8:
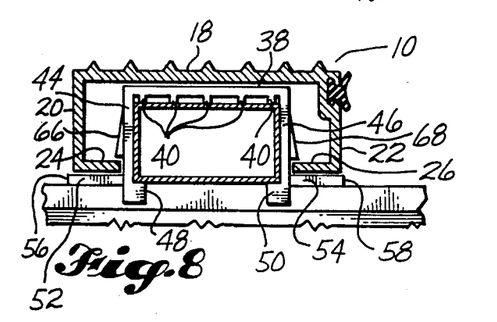
FIG. 8 is a cross-sectional view taken substantially along line 8—8 of FIG. 7.
Figures 9, 10:
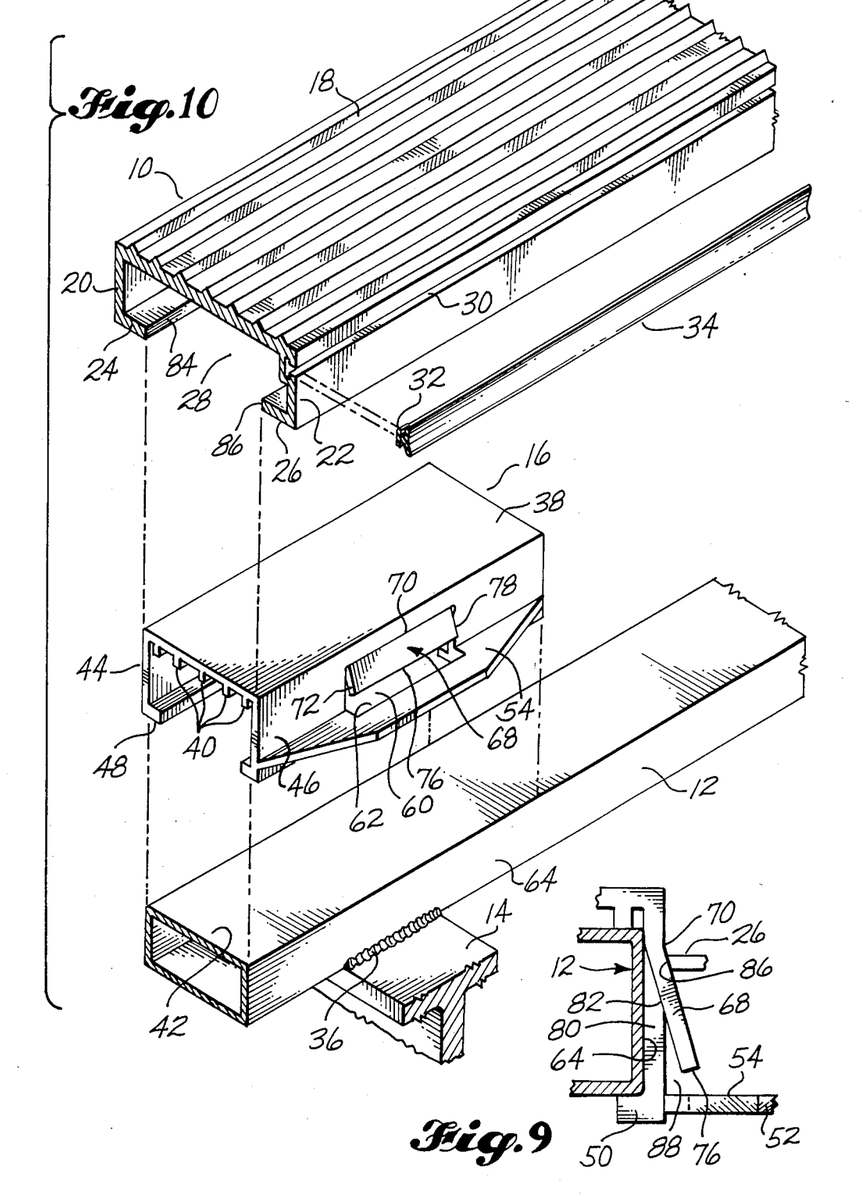
FIG. 9 is an enlarged scale sectional view of a side portion of the assembly shown by FIG. 8.
FIG. 10 is an exploded pictorial view of a slide bearing member spaced above a guide tube and a floor member spaced above the bearing, and a seal member carried by the floor member spaced outwardly from a slot in a side portion of the floor member in which a retainer part of the seal member is received.
Figures 11, 12, 13:
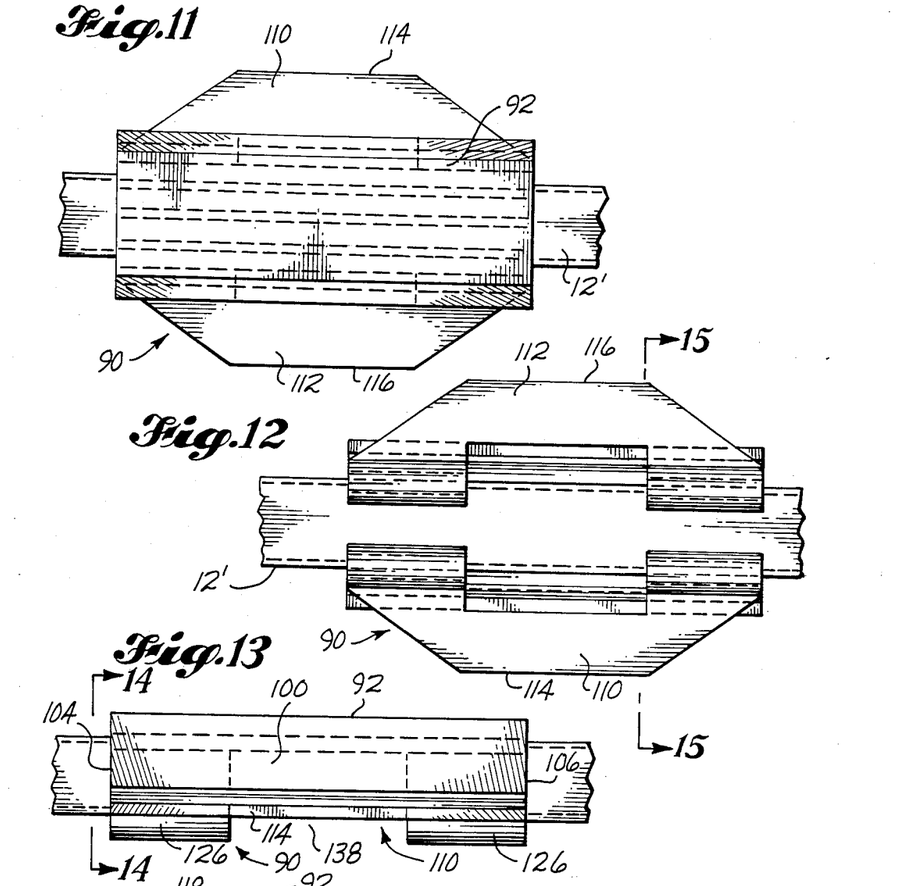
FIG. 11 is a top plan view of a modified form of bearing, installed onto a guide beam.
FIG. 12 is a bottom plan view of the bearing shown by FIG. 10.
FIG. 13 is a side elevational view of the bearing shown by FIGS. 11 and 12.

Referring to FIGS. 8 and 10 in particular, the floor member 10 is shown to comprise a top panel 18, a pair of side panels 20, 22 extending downwardly from the top panel 18, and a pair of bottom flanges 24, 26 which project inwardly from the side panels 20, 22 and define a space 28 (FIG. 10) between them. Side panel 22 may include a longitudinal lock channel 30 of a T-shaped cross section in which a mounting base portion 32 of a seal member 34 is received. Base portion 32 is also T-shaped and it fits snugly within the channel 30, as shown by FIG. 8, for example. The seal member 32 includes one or more lip portions which makes sealing contact with the side panel 20 of the next floor member 10.

The guide beams 12 may be constructed from tubular steel. The guide beams 12 are preferably welded to the transverse beams 14, by fillet welds 36 placed on the opposite sides of the beams 12, as shown by FIG. 10.

A first embodiment of bearing 16, constructed in accordance with the present invention, comprises a top part 38 which may include downwardly projecting ribs 40 having lower edges which make contact with the upper surface 42 of the guide beam 12. Bearing 16 includes side parts 44, 46 which are connected at their tops to the top part 38 of bearing 16 and depend from top part 38 downwardly into positions on the opposite sides of the guide beam 12. Each bearing 38 also includes a pair of lock flanges 48, 50. Lock flange 48 extends inwardly from the lower edge of side part 44. Lock flange 50 extends inwardly from the lower edge of side part 46. When the bearing 38 is installed on a guide beam 12, the lock flanges 48, 50 are located below opposite lower side edges of the beam 12 (as shown by FIG. 8).

In accordance with an aspect of the invention, each bearing 38 includes a brace wing 52, 54 on each of its sides. Wing 52 extends laterally outwardly from side part 44. Wing 54 extends laterally outwardly from side part 46. Brace wings 52, 54 include outer edges 56, 58 which make abutting contact with an adjoining wing of an adjacent bearing. That is, edge 58 will substantially contact the edge 56 of a bearing 16 which is mounted onto the guide beam 12 for the next floor member 10. This arrangement is clearly disclosed by my aforementioned application Ser. No. 346,865 and for that reason is not shown herein.

As best shown by FIG. 10, a cut out region 60 is provided at the inner central portion of each wing 52, 54, so that each wing presents an inner edge 62 which is spaced away from the adjoining side surface 64 of the guide beam 12 a sufficient distance to allow use of a relatively large size fillet weld 36. As explained in my aforementioned pending application Ser. No. 346,865, a problem with the type of arrangement disclosed by U.S. Pat. No. 4,184,587, is that insufficient space exists at the locations of the welds which connect the guide beams to the cross frame members. As a consequence, the welds sometimes break.

As also disclosed by my aforementioned application Ser. No. 346,865, the size of the weld can further be increased by using a narrower guide beam 12.

In accordance with an aspect of the present invention, the central region of each side part 44, 46 of the bearing 16 includes a downwardly and outwardly sloping "flap" wall 66, 68. Each wall 66, 68 is in the nature of a flap portion of its side part 44, 46. It is connected to the side part at its upper edge 70 (FIG. 10). It has free ends 72, 74 and a free lower edge 76. The flaps 66, 68 may be closely equal in thickness to the thickness of the bearing side part 44, 46.

Each flap wall 66, 68 is in the nature of a cantilever beam. It is normally oriented so that it slopes downwardly and outwardly from its connecting edge 70 to its side part 44, 46. A space 80 exists between the inner surface 82 of "flap" wall 68 and the sidewall 64 of guide beam 12.

The top of the bearing 16 is narrower than the space 28 between the two flanges 24, 26 of floor member 10. However, the width of the bearing 16, measured at the level of the lower edges 76 of the flap walls 66, 68, is wider than the space 28.

Bearing construction 16 truly allows the floor members 10 to be "snapped" in place. The installation involves first installing the bearings 16 on the guide beam 12. Then, the floor member 10 is set down onto the bearings with the upper portions of the bearings located in the space 28. The floor member 10 will drop down until the flange edges 84, 86 contact the upper regions of the flap walls 66, 68. Next, the person installing the floor member 10 need only step down on the floor member 10 and walk along its length. The downward force applied to floor member 10 in this manner causes downward movement of the flanges 24, 26 and such movement places inwardly directed forces on the flap walls 66, 68, causing them to swing inwardly into the space 82. The flanges 24, 26 continue to move downwardly until they are in the vertical space 88 defined between the lower edge 76 of the flap walls 66, 68 and the upper surfaces of the wings 52, 54. In an installation which may not include wings 52, 54 on the bearings 16, the flanges 24, 26 will merely slip into positions below the lower edges 76.

Upward movement of the floor member is resisted by contact of the flanges 24, 26 with the lower edges 76 of the flap walls 66, 68. Upward movement is also resisted by the contact made between the retaining flanges 48, 50 of the bearings 16 and the lower corner portions of the guide beams 12. In those installations in which bracing wings 52, 54 are used, upward movement is further resisted by the mutual bracing which occurs from the contact of the outer edges of the wings 52, 54. This contact of wing-to-wing prevents the side parts 44, 46 of the bearings from springing or spreading apart, and it spreads the forces acting upwardly on the floor member out to adjacent floor members and the bearings 16 and guide beams 12 on which they are mounted.

FIGS. 11-15 disclose a modified form of plastic slide bearing 90. Bearing 90 comprises a top part 92 which may be formed to include a plurality of longitudinal ribs 94 on its lower side. Bearing 90 further includes side parts 96, 98. It may include sidewalls, or "flap" walls 100, 102 which are connected at their upper edges to the upper corner portions of the bearing 90. Each flap wall 100, 102 slopes downwardly and outwardly from its location of connection to the top of the bearing 90. Each flap wall 100, 102 includes a free end 104, 106 and a free edge 108.

Preferably, the bearing 90 includes a pair of side wings 110, 112, each having an outer edge 114, 116. As in the first embodiment, the edge 116 of a given bearing 90 will make abutting contact with an edge 114 of an adjacent bearing 90.

Spaces 118, 120 are provided on the inside of each flap wall 100, 102. It is into these spaces that the flap walls 100, 102 swing in response to downward forces applied on them by the flanges 24, 26 of the floor member 10 as the floor member 10 is being snapped into space.

Figures 14, 15:
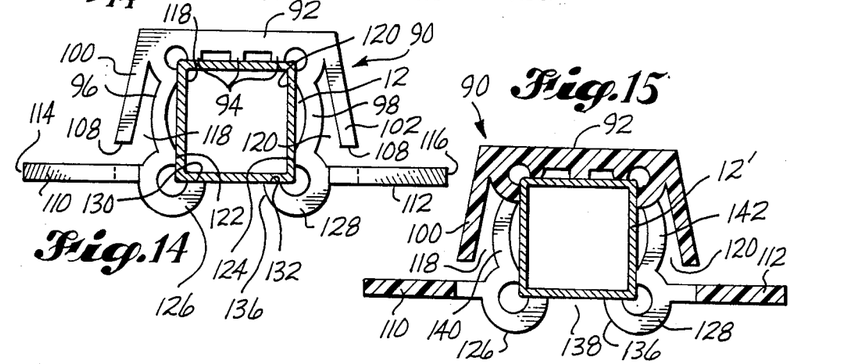
FIG. 14 is a cross sectional view taken substantially along line 14—14 of FIG. 13, showing the bearing in end elevation.
FIG. 15 is a cross-sectional view taken substantially along line 15—15 of FIG. 12.

As clearly shown by FIGS. 14 and 15, the side parts 96, 98 may include inwardly directed ribs 118, 120, 122, 124, and the walls 96, 98 may be arcuate in form, in the vertical direction, between the ribs 118, 122 and 120, 124.

In this embodiment, the bottom lock flanges 126, 128 are shown to extend downwardly and then upwardly from their locations of connection to the wings 110, 112. This provides two functions. Firstly, the vertical space between the upper edges 130, 132 of the lock flanges 126, 128 and the bottoms of the ribs 94 is less than the vertical height of the guide tube 12'. As a result, the lock flanges 126, 128 must be sprung downwardly in order for the bearing 90 to fit on the guide tube 12'. This movement of the lock flanges 126, 128 stores energy in them, and biases them into a tight gripping contact on the guide tubes 12'. It also makes the bearings 90 easier to manufacture in that this feature automatically compensates for differences in sizes between the bearings 90 and the guide tubes 12'. In other words, tolerance of manufacture is not as critical because the spring-like nature of the lock flanges of the bearing compensate for differences in sizes.

Secondly, the shape of the lock flanges provides cam surfaces 134, 136 at the regions between the two lock flanges 126, 128. These cam surfaces are either curved (as shown) or sloped such that the space between the two lock flanges 126, 128 flares outwardly in a downward direction. As a result, the bearings 90 can be set down onto the top of the guide beam 12' with the cam surfaces 134, 136 in contact with the upper corner portions of the guide beam 12'. Then, a downward force can be applied on the bearing 90 and the downward force will be transferred to the cam surface 134, 136, causing the side parts 96, 98 of bearing 90 to be quickly and easily sprung apart until the bearing 90 has snapped into place on the guide beam 12'. Thus, in this embodiment, both the bearing 90 and the floor member 10 can be easily and quickly "snapped" into place.

In the embodiment shown by FIGS. 11-15 spaces 138, 140, 142 are cut out in the central lower and side portions of the bearing 90, to provide space for the fillet welds and for the upper portion of the cross frame member onto which the guide beam 12' is welded.

Figure 16:
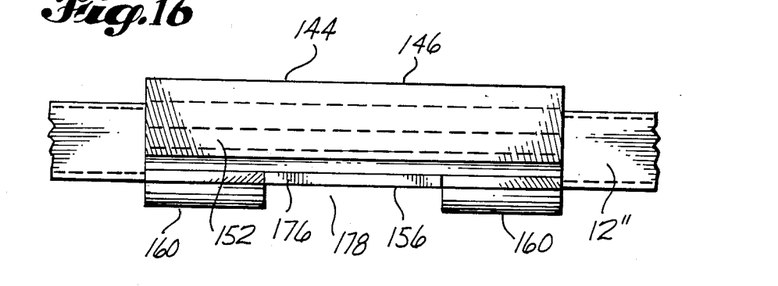
FIG. 16 is a side elevational view of a second modified form of bearing, installed onto a guide beam.
Figure 17:
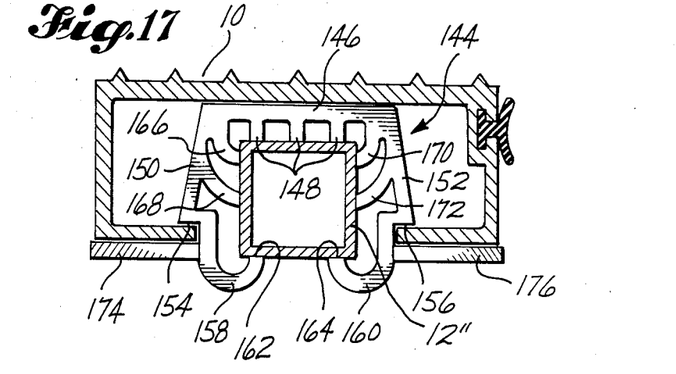
FIG. 17 is a cross-sectional view taken substantially along line 17—17 of FIG. 18.
Figure 18:
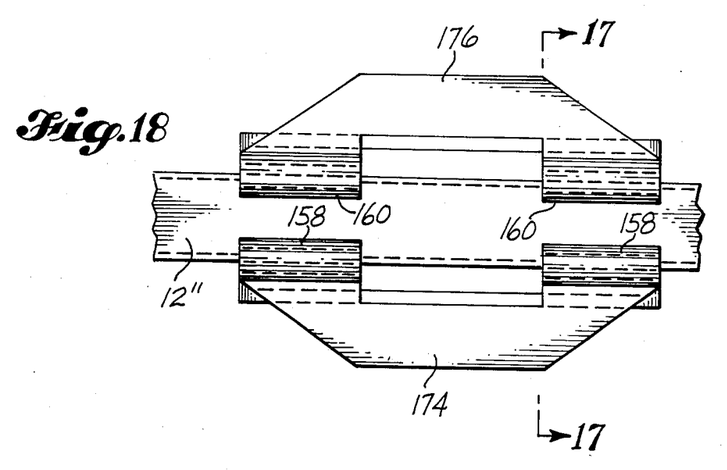
FIG. 18 is a bottom plan view of the bearing shown by FIGS. 16 and 17.

FIGS. 16-18 show a second modified form of the bearing. The bearing 144 shown by these figures comprises a top 146 which may include a plurality of downwardly extending longitudinal ribs 148. Bearing 144 includes outwardly and downwardly sloping sidewalls 150, 152 which are connected at their upper edges to the upper corner portions of the bearing wall 144. The sidewalls 150, 152 extend downwardly to lower edges 154, 156. In this embodiment, the lower lock flanges 158, 160 are secured to the sidewalls 150, 152, inwardly adjacently lower edges 154, 156. The lock flanges 158, 160 each extend first downwardly, and then inwardly, and then upwardly, to present upwardly directed edges 162, 164 into a position to contact the lower surface of the guide tube 12". As should be evident, the lock flanges 158, 160 are in the nature of springs. The vertical distance between the upper surfaces 162, 164 and the lower surfaces of the ribs 142, is smaller, by design, then the height of the guide tube 12". As in the last embodiment, this means that the lock flanges 158, 160 must spring downwardly to some extent in order to accommodate the guide beam 12" between the surfaces 148 and 162, 164. Thus, this construction accommodates sized differences between the guide beams 12" and the bearings 144, and always assures a tight fit of the bearing 144 onto its guide beam 12".

In the embodiment shown by FIGS. 16–18, the sidewalls 150, 152 may include internal ribs 166, 168, 170, 172. Such ribs are shown to extend downwardly at an angle from their locations of connection to the sidewalls 150, 152. As a result, a downward force applied on the sidewalls 150, 152, by a floor member 10 being snapped in place, will cause the ribs 166, 168 and 170, 172 to bend and this bending will allow the sidewalls 150, 152 to bend inwardly. Sufficient space is allowed in between the sidewalls 150, 152, and the sidewalls of the guide beam 12" to accommodate the necessary bending movement of both the sidewalls 150, 152 and the ribs 166, 168 and 170, 172.

This embodiment may also include brace wings 174, 176. The wings 174, 176 are shown to be connected to the lock flange members 158, 160, and to be spaced vertically below the raw edges 154, 156, to define a slot-like space into which the inner free edges of the floor member flanges 24, 26 are received when the bearing 144 is installed on its guide beam 12" and the floor member 10 is installed on the bearing 144.

As in the earlier embodiment, the lower central region of the bearing 144 is cut away at 178, to provide room for relatively large sized fillet welds and for the upper portion of the cross frame member to which the guide beam 12" is secured.

Of course, given the information that is set forth above, one could construct other embodiments of snap on plastic slide bearings which will include sidewalls which can flex inwardly in response to downward movement of a floor member, so that the floor member can be easily "snapped" into place on the bearings. And, additional embodiments of the bearings can be made in which the bearings are adapted to themselves "snap" onto the guide beams.

The embodiments which have been described above are presented for illustration and not limitation. I am only to be limited to the wording of the claims which follow, interpretated in accordance with the rules of claim interpretation, including the doctrine of equivalents.

What is claimed is:

1. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam and a plurality of spaced apart plastic slide bearings on the guide beam, and further comprising drive means for moving the floor members in one direction along the guide beams and bearings, for advancing a load, and for retracting them in the opposite direction, an improved bearing system for the floor members characterized by:

each said plastic slide bearing having a top positioned above the guide beam, a side part on each side of the bearing depending from the top outwardly adjacent the sides of the guide beam, and a bottom lock flange projecting inwardly from each side part below the guide beam, and a wing on each side of the bearing, extending laterally outwardly from the bearing, said wings being in coplanar parallelism with each other and being spaced below and in parallelism with the top of the bearing, each said wing having an outer edge which makes mutually bracing contact with the outer edge of an adjacent wing on an adjacent plastic slide bearing, said bearing top being of a width smaller than the space between the two bottom flanges of the floor member, and each side part of each bearing including a sidewall which slopes downwardly and outwardly to a lower edge, said bearing having a width at the level of the lower edges of said sidewalls which is wider than the width of the space between the two bottom flanges of the floor member, each said sidewall lower edge being spaced above the upper surface of the wing on its side of the bearing, to define with the wing a space in which an inner edge portion of the bottom flange of the floor member on its side of the bearing is received, said sidewall being resiliently connected to the bearing such that the floor member can be set down on top of the bearing, with the top of the bearing positioned in the space between the two bottom flanges of the floor member, and the floor member can then be pushed downwardly, and the downward force applied by the flanges of the floor member on said sidewalls of the bearing will cause the sidewalls to spring inwardly to allow the floor member to move downwardly until the bottom flanges are in the slots defined between the bottom edges of the sidewalls and the top surfaces of the wings, at which time the sidewalls will spring outwardly into positions placing their lower edges above the bottom flanges of the floor member;

wherein said downwardly and outwardly sloping sidewalls are located generally at the longitudinal center of the bearing, and each is in the nature of a flap which is connected at its top to the bearing and has free ends and a free lower edge, each said sidewall functioning like a cantilever beam and bending at its edge of connection to the bearing in response to the downward force exerted on it by the flange of the floor member.

2. A system according to claim 1, wherein the central inner portion of each wing includes an inner edge which is spaced outwardly from the adjacent side of its guide beam, at a distance sufficient to provide clearance for a fillet weld of substantial size between the side of the guide beam and the top of a support for the guide beam.

3. In a reciprocating floor conveyor of a type comprising a plurality of elongated floor members, each of which is a metal extrusion of channel form comprising a top panel, a pair of opposite side panels extending downwardly from the top panel, and a pair of bottom flanges projecting inwardly from the side panels and defining a space between them, and each of which is supported on and guided by an elongated metal guide beam and a plurality of spaced apart plastic slide bearings on the guide beam, and further comprising drive means for moving the floor members in one direction along the guide beams and bearings, for advancing a load, and for retracting them in the opposite direction, an improved bearing system for the floor members characterized by:

each said plastic slide bearing having a top positioned above the guide beam, a side part on each side of the bearing depending from the top outwardly adjacent the sides of the guide beam, and a bottom lock flange projecting inwardly from each side part below the guide beam, and a wing on each side of the bearing, extending laterally outwardly from the bearing, said wings being in coplanar parallelism with each other and being spaced below and in parallelism with the top of the bearing, each said wing having an outer edge which makes mutually bracing contact with the outer edge of an adjacent wing on an adjacent plastic slide bearing, said bearing top being of a width smaller than the space between the two bottom flanges of the floor member, and each side part of each bearing including a sidewall which slopes downwardly and outwardly to a lower edge, said bearing having a width at the level of the lower edges of said sidewalls which is wider than the width of the space between the two bottom flanges of the floor member, each said sidewall lower edge being spaced above the upper surface of the wing on its side of the bearing, to define with the wing a space in which an inner edge portion of the bottom flange of the floor member on its side of the bearing is received, said sidewall being resiliently connected to the bearing such that the floor member can be set down on top of the bearing, with the top of the bearing positioned in the space between the two bottom flanges of the floor member, and the floor member can then be pushed downwardly, and the downward force applied by the flanges of the floor member on said sidewalls of the bearing will cause the sidewalls to spring inwardly to allow the floor member to move downwardly until the bottom flanges are in the slots defined between the bottom edges of the sidewalls and the top surfaces of the wings, at which time the sidewalls will spring outwardly into positions placing their lower edges above the bottom flanges of the floor member;

wherein each sidewall extends along a side of the bearing, and is in the form of a downwardly and outwardly sloping relatively thin panel connected at is top to the top of the bearing, with a space existing between said panel and the bearing, and with said panel functioning like a cantilever beam, and bending inwardly into said space in response to a downward force on it applied by the floor member.

4. A system according to claim 3, wherein the lock flanges of the bearing extend from the side parts of the bearing first downwardly and then upwardly, and each presents an upwardly directed edge which makes contact with a lower surface of the guide beam, said bearing including an inner top portion which makes contact with the top surface of the guide beam, and wherein the vertical distance between the inner top portion and the upwardly directed edge of the lock flange is less than the vertical height of the guide beam, so that the lock flanges of the bearing must bend somewhat in order for the bearing to fit on the guide beam.

5. For use with a reciprocating floor conveyor of a type comprising a plurality of elongated floor members, each of which is of channel form comprising a top panel, a pair of opposite side panels extending downwardly from the top panel, and a pair of bottom flanges projecting inwardly from the side panels and defining a space between them, and each of which is supported on and guided by an elongated metal guide beam and a plurality of spaced apart plastic slide bearings on the guide beam, an improved plastic slide bearing adapted to snap fit onto its guide beam and to permit the floor member to be snap fitted onto it, said plastic slide bearing comprising:

a top which in use is positioned above the guide beam, a side part on each side of the bearing depending from said top and in use occupying a position outwardly adjacent the sides of the guide beam, and a bottom lock flange projecting inwardly from each side part, said lock flanges in use extending below and engaging the lower portions of the guide beam, for holding the plastic slide bearing onto the guide beam, said lock flanges having lower cam surfaces, shaped such that the bearing can be set down onto the top of the guide beam, with said cam surfaces positioned on upper corner portions of the guide beam, and upon a downward force being exerted on the bearing the contact made between the upper corner portions of the guide beam and the cam surfaces on the lock flanges will cause the side parts of the bearing to spring outwardly until the guide beam is located horizontally between the side parts and vertically between the top and the lock flanges, of the bearings, and said bearing top being of a width smaller than the space between the two bottom flanges of the floor member, and each side part of the bearing including a sidewall which slopes downwardly and outwardly to a lower edge, said bearing having a width at the level of the lower edges of said sidewalls which is wider than the width of the space between the two bottom flanges of the floor member, and said sidewalls being resiliently connected to the bearing such that the floor member can be set down on top of a bearing which has been installed onto a guide beam, with the top of the bearing positioned in the space between the two bottom flanges of the floor member, and the floor member can then be pushed downwardly, and the downward force applied by the flanges of the floor member on said sidewalls of the bearing will cause such sidewalls to spring inwardly to allow the floor member to move downwardly until its bottom flanges are located below the bottom edges of the sidewalls, at which time the sidewalls will spring outwardly into positions placing their lower edges above the bottom flanges of the floor member;

wherein said downwardly and outwardly sloping sidewalls are located generally at the longitudinal center of the bearing, and each is in the nature of a flap which is connected at its top to the bearing and has free ends and a free lower edge, each said sidewall functioning like a cantilever beam and bending at its edge of connection to the bearing in response to the downward force exerted on it by the flange of the floor member.

6. For use with a reciprocating floor conveyor of a type comprising a plurality of elongated floor members, each of which is of channel form comprising a top panel, a pair of opposite side panels extending downwardly from the top panel, and a pair of bottom flanges projecting inwardly from the side panels and defining a space between them, and each of which is supported on and guided by an elongated metal guide beam and a plurality of spaced apart plastic slide bearings on the guide beam, an improved plastic slide bearing adapted to snap fit onto its guide beam and to permit the floor member to be snap fitted onto it, said plastic slide bearing comprising:

a top which in use is positioned above the guide beam, a side part on each side of the bearing depending from said top and in use occupying a position outwardly adjacent the sides of the guide beam, and a bottom lock flange projecting inwardly from each side part, said lock flanges in use extending below and engaging the lower portions of the guide beam, for holding the plastic slide bearing onto the guide beam, said lock flanges having lower cam surfaces, shaped such that the bearing can be set down onto the top of the guide beam, with said cam surfaces positioned on upper corner portions of the guide beam, and upon a downward force being exerted on the bearing the contact made between the upper corner portions of the guide beam and the cam surfaces on the lock flanges will cause the side parts of the bearing to spring outwardly until the guide beam is located horizontally between the side parts and vertically between the top and the lock flanges, of the bearings, and said bearing top being of a width smaller than the space between the two bottom flanges of the floor member, and each side part of the bearing including a sidewall which slopes downwardly and outwardly to a lower edge, said bearing having a width at the level of the lower edges of said sidewalls which is wider than the width of the space between the two bottom flanges of the floor member, and said sidewalls being resiliently connected to the bearing such that the floor member can be set down on top of a bearing which has been installed onto a guide beam, with the top of the bearing positioned in the space between the two bottom flanges of the floor member, and the floor member can then be pushed downwardly, and the downward force applied by the flanges of the floor member on said sidewalls of the bearing will cause such sidewalls to spring inwardly to allow the floor member to move downwardly until its bottom flanges are located below the bottom edges of the sidewalls, at which time the sidewalls will spring outwardly into positions placing their lower edges above the bottom flanges of the floor member;

wherein each sidewall extends along a side of the bearing, and is in the form of a downwardly and outwardly sloping relatively thin panel connected at its top to the top of the bearing, with a space existing between said panel and the bearing, and with said panel functioning like a cantilever beam, and bending inwardly into said space in response to a downward force on it applied by the floor member.

7. A system according to claim 6, wherein the lock flanges of the bearing extend from the side parts of the bearing first downwardly and then upwardly, and each presents an upwardly directed edge which makes contact with a lower surface of the guide beam, said bearing including an inner top portion which in use makes contact with a top surface of a guide beam, and wherein the vertical distance between the inner top portion and the upwardly directed edge of the lock flange is less than the vertical height of the guide beam, so that the lock flanges of the bearing must bend somewhat in order for the bearing to fit on the guide beam.

* * * * *